United States Patent
Murase et al.

(10) Patent No.: US 7,726,289 B2
(45) Date of Patent: Jun. 1, 2010

(54) CONTROL APPARATUS AND CONTROL METHOD FOR INTERNAL COMBUSTION ENGINE

(75) Inventors: Nao Murase, Susono (JP); Hiroki Ichinose, Fujinomiya (JP); Yuuichi Katou, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 390 days.

(21) Appl. No.: 11/665,644

(22) PCT Filed: Aug. 1, 2006

(86) PCT No.: PCT/IB2006/002104

§ 371 (c)(1),
(2), (4) Date: Apr. 18, 2007

(87) PCT Pub. No.: WO2007/015150

PCT Pub. Date: Feb. 8, 2007

(65) Prior Publication Data
US 2009/0101115 A1    Apr. 23, 2009

(30) Foreign Application Priority Data
Aug. 2, 2005 (JP) ............................. 2005-224042

(51) Int. Cl.
F02D 41/06 (2006.01)
F01L 1/34 (2006.01)
(52) U.S. Cl. .................... 123/685; 123/491; 123/90.15
(58) Field of Classification Search ... 123/90.15–90.18, 123/685, 491; 60/284, 285, 300
See application file for complete search history.

(56) References Cited

U.S. PATENT DOCUMENTS

| 5,531,193 | A | 7/1996 | Nakamura |
| 6,062,201 | A | 5/2000 | Nozawa et al. |
| 6,266,957 | B1 * | 7/2001 | Nozawa et al. ............. 60/284 |
| 6,513,319 | B2 * | 2/2003 | Nozawa et al. ............. 60/284 |
| 6,691,506 | B2 * | 2/2004 | Shimizu ..................... 60/284 |
| 7,063,056 | B2 * | 6/2006 | Nakai et al. ............. 123/90.15 |
| 7,406,937 | B2 * | 8/2008 | Kulzer et al. ............. 123/179.3 |
| 7,406,942 | B2 * | 8/2008 | Ashizawa et al. .......... 123/295 |

(Continued)

FOREIGN PATENT DOCUMENTS

DE    10 2004 016 386 A1    10/2005

(Continued)

OTHER PUBLICATIONS

Foreign Office Action issued Mar. 26, 2009 for Japanese Patent Application No. 2005-224042 (with translation).

*Primary Examiner*—Erick Solis
(74) *Attorney, Agent, or Firm*—Oliff & Berridge, PLC

(57) ABSTRACT

In at least a first cycle at startup, an opening timing of an exhaust valve is controlled to 45 degrees before-bottom-dead-center of an exhaust stroke, or to a retard side of the normal closing timing that is set after warm-up is complete. Also, the closing timing of the exhaust valve is preferably controlled to an advance side of top-dead-center in a second cycle at startup and thereafter at the latest. Accordingly, the amount of unburned HC discharged during a cold start of an internal combustion engine is reduced.

14 Claims, 10 Drawing Sheets

U.S. PATENT DOCUMENTS

| | | | |
|---|---|---|---|
| 2003/0070637 A1* | 4/2003 | Majima | 123/90.15 |
| 2004/0055283 A1 | 3/2004 | Iihoshi et al. | |
| 2004/0107947 A1* | 6/2004 | Ichinose et al. | 123/491 |
| 2005/0155581 A1* | 7/2005 | Wells et al. | 123/491 |
| 2006/0201469 A1 | 9/2006 | Casal Kulzer et al. | |

FOREIGN PATENT DOCUMENTS

| | | |
|---|---|---|
| EP | 1 186 752 A2 | 3/2002 |
| JP | A-07-109934 | 4/1995 |
| JP | A-09-079056 | 3/1997 |
| JP | A 10-068332 | 3/1998 |
| JP | A-11-159423 | 6/1999 |
| JP | A 2000-130194 | 5/2000 |
| JP | A-2001-050040 | 2/2001 |
| JP | A 2001-159353 | 6/2001 |
| JP | A 2001-263050 | 9/2001 |
| JP | A 2001-342856 | 12/2001 |
| JP | A 2003-120348 | 4/2003 |
| JP | A-2004-124753 | 4/2004 |
| JP | A-2004-332565 | 11/2004 |
| WO | WO 2004/061274 A1 | 7/2004 |

* cited by examiner

CONTROL APPARATUS AND CONTROL METHOD FOR INTERNAL COMBUSTION ENGINE

INCORPORATION BY REFERENCE

The disclosure of Japanese Patent Application No. 2005-224042 filed on Aug. 2, 2005, including the specification, drawings and abstract is incorporated herein by reference in its entirety.

BACKGROUND OF THE INVENTION

1. Field of the Invention

The invention relates to a control apparatus and control method for an internal combustion engine. More specifically, the invention relates to control technology for reducing the amount of HC discharged during startup of the internal combustion engine.

2. Description of the Related Art

During a cold start of an internal combustion engine, fuel atomizes poorly compared to after the engine has warmed up. As a result, unburned HC (Hydro-Carbon) which did not contribute to combustion tends to adhere to the surface of the cylinder wall. When the piston rises in the cylinder, the unburned HC that had adhered to the surface of the cylinder wall is pushed up by the piston and released into the exhaust passage together with combustion gas when the exhaust valve opens. Accordingly, large amounts of unburned HC is contained in combustion gas that is discharged from the internal combustion engine during a cold start, and particularly in combustion gas discharged right before TDC (Top Dead Center), compared with after the engine has warmed up.

A catalyst for removing toxic components in the combustion gas is disposed in the exhaust passage of the internal combustion engine. When the catalyst is cold, however, it is unable to purify the combustion gas sufficiently. As a result, when the catalyst temperature is low and the catalyst is not yet activated, such as during a cold start of the internal combustion engine, unburned HC contained in the combustion gas ends up being released into the atmosphere without being sufficiently purified. Therefore, in order to prevent exhaust gas emissions during a cold start from deteriorating, it is necessary to reduce the actual amount of unburned HC that is discharged from the internal combustion engine.

Japanese Patent Application Publication No. JP-A-2003-120348 discloses one example of technology that reduces the amount of unburned HC discharged during a cold start. The related art disclosed in that publication aims to reduce the amount of unburned HC that is discharged by advancing the closing timing of the exhaust valve with respect to TDC of the intake stroke from engine startup, and closing combustion gas containing large amounts of unburned HC to be discharged in the combustion chamber right before TDC. Japanese Patent Application Publication No. JP-A-2001-159353 and Japanese Patent Application Publication No. JP-A-2001-263050 also disclose related art.

There is a need to reduce the amount of unburned HC that adheres to the surface of the cylinder wall during combustion in the first cycle at startup of the internal combustion engine by burning the fuel that is injected for the initial combustion as completely as possible. Accordingly, it is necessary to sufficiently promote an HC oxidation reaction within the combustion chamber.

During startup, and particularly during a cold start, of the internal combustion engine, however, the temperature and pressure in the combustion chamber are low, opposite of a high temperature-high pressure atmosphere that promotes an HC oxidation reaction. In addition, because the temperature of the surface of the cylinder wall is low, fuel tends to adhere to it. The related art disclosed in Japanese Patent Application Publication No. JP-A-2003-120348 does not take into consideration unburned HC that is produced during combustion in the first cycle at startup. Thus there is still room for improvement with respect to reducing the amount of unburned HC that is discharged.

SUMMARY OF THE INVENTION

In view of the foregoing problems, this invention thus provides a control apparatus for an internal combustion engine, which is capable of reducing the amount of unburned HC discharged at startup, and particularly during a cold start, of an internal combustion engine.

Therefore, one aspect of the invention relates to a control apparatus for an internal combustion engine which is provided a controller in which an operation angle is fixed. The controller changes an opening timing and a closing timing of an exhaust valve with the operation angle remaining constant, and the controller controls the opening timing of the exhaust valve to a retard side of the opening timing set in a second cycle and thereafter until a first cycle at startup ends.

Also, another aspect of the invention relates to a control method for an internal combustion engine in which an operation angle is fixed. The control method comprises: changing an opening timing and a closing timing of an exhaust valve with the operation angle remaining constant; and controlling the opening timing of the exhaust valve to a retard side of the opening timing set in a second cycle and thereafter until the first cycle at startup ends.

According to the control apparatus and control method for an internal combustion engine as described above, the closing timing of the exhaust valve is controlled to the retard side of the opening timing that is set in the second cycle and thereafter until the first cycle at startup ends. As a result, the burn time of the air-fuel mixture inside the combustion chamber in the first cycle at startup can be increased, which promotes the oxidation reaction of HC such that the amount of unburned HC that is generated can be reduced.

Also, the closing timing of the exhaust valve may also be controlled to an advance side of top-dead-center of the intake stroke in the second cycle at startup and thereafter.

According to the control of the internal combustion engine described above, the closing timing of the exhaust valve is controlled to the advance side of top-dead-center of the intake stroke in the second cycle at startup and thereafter. As a result, combustion gas containing large amounts of unburned HC to be discharged can be closed in the combustion chamber right before top-dead-center of the intake stroke, thus enabling the amount of unburned HC that is discharged from the combustion chamber to be further reduced.

Also, the valve timing of the exhaust valve may be changed to a normal valve timing determined from the operating state of the internal combustion engine when an engine temperature exceeds a predetermined temperature or when it is estimated that the engine temperature has exceeded the predetermined temperature.

Most of the unburned HC during startup is due to fuel adhering to the cylinder wall surface in droplet form. The amount of fuel that adheres to the cylinder wall surface, however, decreases as the engine temperature increases. According to the control of an internal combustion engine as described above, it is possible to reduce the amount of unburned HC that is discharged at startup by controlling the valve timing of the exhaust valve to the valve timing described above until the engine temperature rises to a predetermined temperature. Once the engine temperature exceeds the predetermined temperature, the desired operating performance can then be obtained without the amount of unburned HC that is discharged increasing by changing the valve timing to the normal valve timing that is determined by the operating state of the internal combustion engine.

Also, in the case of an internal combustion engine capable of fuel injection timing control which controls the injection timing of fuel into the intake port from a fuel injection valve, the fuel injection timing in the first cycle at startup may be set to within a period during which the intake valve is closed, and the fuel injection timing in the second cycle and thereafter may be set to match the opening timing of the intake valve.

According to the control of the internal combustion engine as described above, vaporization time of the fuel in the intake port can be ensured in the first cycle at startup in which there is no combustion gas in the combustion chamber, while the atomization of fuel can be promoted by high temperature combustion gas blowing back into the intake port from within the combustion chamber in the second cycle and thereafter in which there is residual combustion gas in the combustion chamber. Accordingly, the combustion of fuel within the combustion chamber can be promoted, thus enabling the amount of unburned HC that is generated to be reduced.

Yet another aspect of the invention relates to a control apparatus for an internal combustion engine which is provided with a controller in which an operation angle is variable. The controller changes an opening timing and a closing timing of the exhaust valve either independently or in association with the operation angle. The controller controls the opening timing of the exhaust valve to a retard side of the opening timing set in a cycle (N+1) that is next after an Nth cycle (the Nth cycle is a predetermined cycle with N being a natural number) and thereafter from startup until the predetermined cycle ends.

Still yet another aspect of the invention relates to a control method for an internal combustion engine in which an operation angle is variable, comprises: changing an opening timing and a closing timing of the exhaust valve either independently or in association with the operation angle and controlling the opening timing of the exhaust valve to a retard side of the opening timing set in a cycle that is next after a predetermined cycle and thereafter from startup until the predetermined cycle ends.

According to the control apparatus and control method for an internal combustion engine as described above, the opening timing of the exhaust valve is controlled to a retard side of the opening timing set in the N+1 cycle and thereafter from startup until the Nth cycle (which is a predetermined cycle) ends. As a result, the burn time of the air-fuel mixture in the combustion chamber until the Nth cycle can be increased, which promotes the HC oxidation reaction and thus enables the amount of unburned HC that is generated to be reduced.

Also, the closing timing of the exhaust valve may be controlled to an advance side of top-dead-center of the intake stroke in the second cycle at startup and thereafter at the latest. Also, the closing timing of the exhaust valve may be controlled to an advance side of top-dead-center of the intake stroke in the first cycle at startup and thereafter.

According to the control of an internal combustion engine as described above, the closing timing of the exhaust valve is controlled to the advance side of top-dead-center of the intake stroke from the second cycle at startup and thereafter at the latest, or from the first cycle at startup and thereafter. As a result, combustion gas containing large amounts of unburned HC to be discharged can be closed in the combustion chamber right before top-dead-center of the intake stroke, thus enabling the amount of unburned HC discharged from the combustion chamber to be reduced.

Also, the predetermined cycle (Nth cycle) may be designated to be when the engine temperature has exceeded a predetermined temperature or when it is estimated that the engine temperature has exceeded the predetermined temperature, and the valve timing of the exhaust valve may be changed to a normal valve timing determined from the operating state of the internal combustion engine in the next cycle (N+1) after the predetermined cycle and thereafter.

According to the control of the internal combustion engine as described above, the opening timing of the exhaust valve is controlled to the retard side until the engine temperature rises to a predetermined temperature. As a result, the burn time of the air-fuel mixture within the combustion chamber can be sufficiently ensured until the temperature in the combustion chamber rises sufficiently, thus enabling the amount of unburned HC generated to be even more reliably reduced. Also, the valve timing is changed to the normal valve timing determined by the operating state of the internal combustion engine in and after the N+1 cycle in which the engine temperature has exceeded the predetermined temperature.

Also, in the case of an internal combustion engine capable of fuel injection timing control for controlling the injection timing of fuel into the intake port from a fuel injection valve, the fuel injection timing in the first cycle at startup may be set to within a period during which the intake valve is closed, and the fuel injection timing in the second cycle at startup and thereafter may be set to match the opening timing of the intake valve.

According to the control of the internal combustion engine as described above, vaporization time of the fuel in the intake port can be ensured in the first cycle at startup in which there is no residual combustion gas in the combustion chamber, and atomization of fuel can be promoted by high temperature combustion gas that blows back into the intake port from within the combustion chamber in and after the second cycle in which there is residual combustion gas in the combustion chamber. As a result, combustion of fuel within the combustion chamber can be promoted, which in turn enables the amount of unburned HC generated to be reduced.

BRIEF DESCRIPTION OF THE DRAWINGS

The features, advantages thereof, and technical and industrial significance of this invention will be better understood by reading the following detailed description of the exemplary embodiments of the invention, when considered in connection with the accompanying drawings, in which.

DESCRIPTION OF THE EXEMPLARY EMBODIMENTS

In the following description and the accompanying drawings, the present invention will be described in more detail with reference to exemplary embodiments. Hereinafter, a first exemplary embodiment of the invention will be described with reference to FIGS. 1 to 5.

Figure 1:
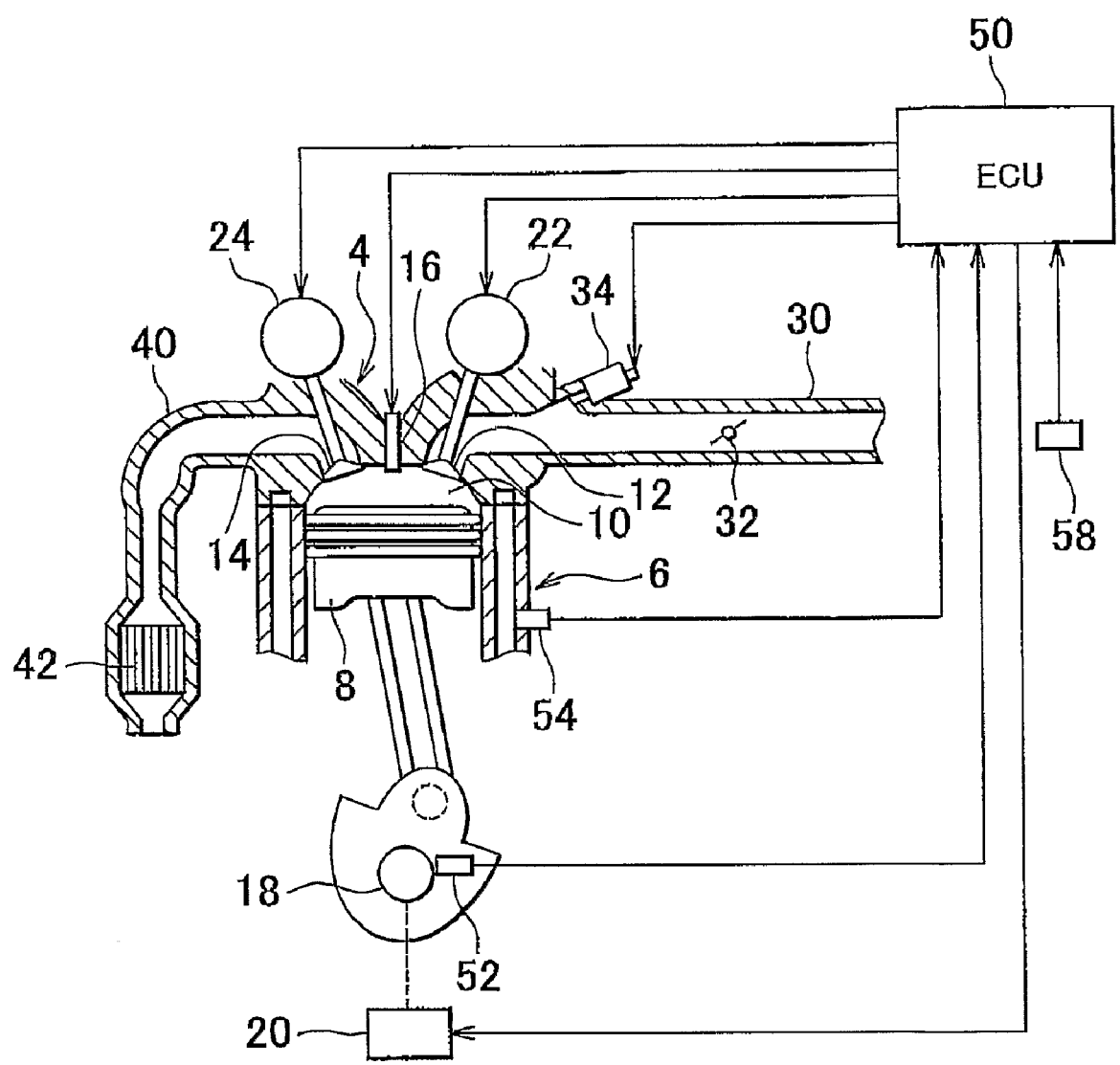
FIG. 1 is a block view schematically showing an internal combustion engine to which a control apparatus according to a first exemplary embodiment of the invention has been applied.

FIG. 1 is a block view schematically showing an internal combustion engine to which a control apparatus according to a first exemplary embodiment of the invention has been applied. The internal combustion engine according to this exemplary embodiment is a spark-ignition 4-stroke engine. The internal combustion engine is provided with a cylinder block 6 inside of which a piston 8 is arranged, and a cylinder head 4 assembled to the cylinder block 6. A combustion chamber 10 is formed in the space between the upper surface of the piston 8 and the cylinder head 4. An intake passage 30 and an exhaust passage 40 are connected to the cylinder head 4 so as to communicate with the combustion chamber 10. A spark plug 16 is mounted at the top of the combustion chamber 10.

An intake valve 12 which controls the communication state between the intake passage 30 and the combustion chamber 10 is provided at a portion where the intake passage 30 connects to the combustion chamber 10. This intake valve 12 is provided with an intake valve timing control apparatus 22 which variably controls the valve timing of the intake valve 12. Similarly, an exhaust valve 14 which controls the communication state between the exhaust passage 40 and the combustion chamber 10 is provided at a portion where the exhaust passage 40 connects to the combustion chamber 10. This exhaust valve 14 is provided with an exhaust valve timing control apparatus 24 which variably controls the valve timing of the exhaust valve 14. In this exemplary embodiment, a variable valve timing mechanism (VVT) is used as the intake valve timing control apparatus 22 and the exhaust valve timing control apparatus 24. This variable valve timing mechanism advances or retards the opening and closing timings with the operation angle remaining constant by changing the phase angle of a cam shaft, not shown, with respect to a crankshaft 18.

A throttle valve 32 is disposed in the intake passage 30. A downstream portion of the intake passage 30 branches off to each cylinder. An injector 34 for injecting fuel is provided in each branch passage. A catalyst 42 for removing toxic components in the combustion gas that is discharged from the combustion chamber is provided in the exhaust passage 40.

Also, the internal combustion engine according to the exemplary embodiment also includes an ECU (Electronic Control Unit) 50 which serves as the control apparatus for the internal combustion engine. Various components, such as a starter 20 and the like, in addition to the valve timing control apparatuses 22 and 24, the injector 34, the throttle valve 32, and the spark plug 16, described above, are all connected to the output side of the ECU 50. Various sensors, such as a crank angle sensor 52 and a coolant temperature sensor 54, as well as various switches, such as an ignition switch 58, are connected to the input side of the ECU 50. The crank angle sensor 52 is a sensor which outputs a signal indicative of the rotation angle of the crankshaft 18, and the coolant temperature sensor 54 is a sensor which outputs a signal indicative of the coolant temperature of the internal combustion engine. The ECU 50 controls the various components in accordance with a predetermined control program based on the outputs of the sensors and switches.

Figure 2:
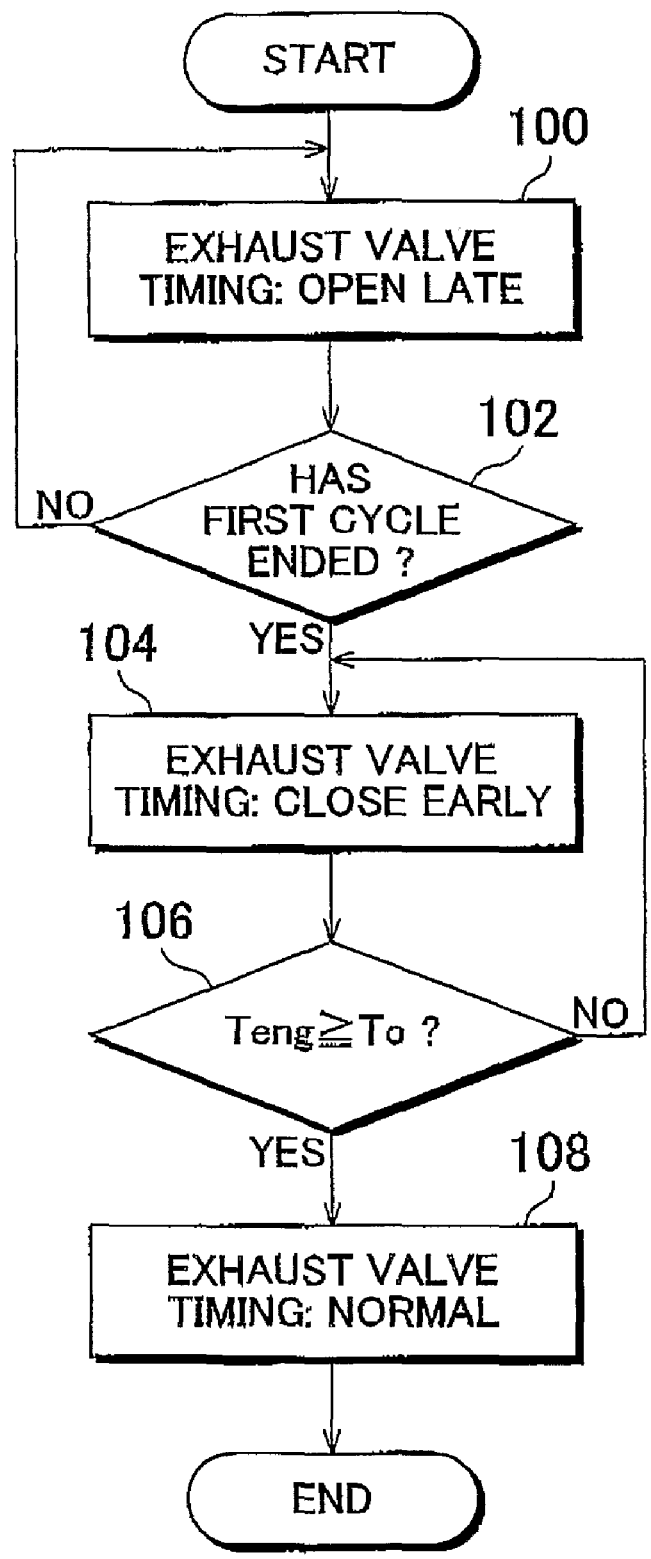
FIG. 2 is a flowchart of an exhaust valve timing control routine that is executed in the first exemplary embodiment of the invention.

FIG. 2 is a flowchart illustrating the details of exhaust valve timing control executed by the ECU 50 in the exemplary embodiment. The routine shown in FIG. 2 is executed simultaneously with the turning on of the ignition switch 58 and the start of cranking of the internal combustion engine. This routine is executed for each cylinder.

First in step 100 of this routine, the exhaust valve timing control apparatus 24 sets the exhaust valve timing so that the exhaust valve 14 opens late (i.e., opening is retarded). That is, the exhaust valve timing control apparatus 24 sets the opening timing of the exhaust valve 14 to the retard side of the normal opening timing. The term normal opening timing of the exhaust valve 14 here is the opening timing that is set after startup is complete, and refers to the optimal opening timing for discharging combusted gas such that none remains in the combustion chamber in the next cycle because of the property of gas exchange. More specifically, this optimal opening timing is preferably close to BBDC (Before Bottom Dead Center) 45 degrees of the exhaust stroke. In this exemplary embodiment, the normal opening timing of the exhaust valve 14 is set to BBDC 45 degrees.

Figure 3A:
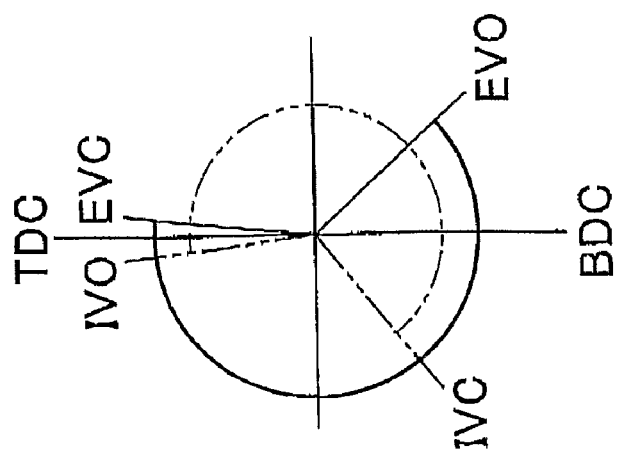
FIG. 3A is a view showing the valve timings of the intake and exhaust valves in the first cycle at startup, according to the first exemplary embodiment of the invention.
Figure 3B:
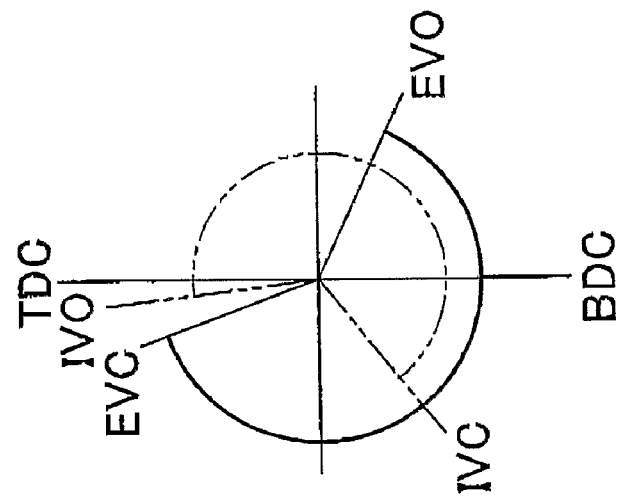
FIG. 3B is a view showing the valve timings of the intake and exhaust valves in the second cycle at startup and thereafter, according to the first exemplary embodiment of the invention.
Figure 3C:
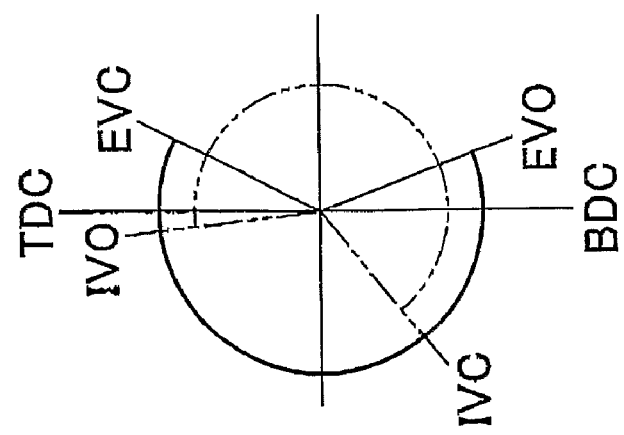
FIG. 3C is a view showing the valve timings of the intake and exhaust valves during normal operation, according to the first exemplary embodiment of the invention.

FIGS. 3A to 3C are views showing the valve timings of the intake valve 12 and the exhaust valve 14. The valve timing shown in FIG. 3C is the normal valve timing, and the valve timing shown in FIG. 3A is the valve timing set in step 100. In the drawings, EVO denotes the opening timing of the exhaust valve 14, EVC denotes the closing timing of the exhaust valve 14, IVO denotes the opening timing of the intake valve 12, and IVC denotes the closing timing of the intake valve 12. As is evident upon comparing FIGS. 3A and 3C, in step 100, the EVO is set closer to BDC than it is during normal operation, i.e., BBDC 45 degrees. The intake valve timing is set the same as it is during normal operation.

In the next step, step 102, it is determined whether the first cycle of the cylinder at startup has ended. This determination can be made based on the rotation angle of the crankshaft 18 that is measured by the signal from the crank angle sensor 52. After the ignition switch 58 has been turned on, the starter 20 cranks the internal combustion engine. When the engine speed exceeds the speed necessary for the initial combustion, the injector 34 injects fuel for the initial combustion. The cycle during which this fuel for the initial combustion is injected is the first cycle at startup. From the start of cranking of the internal combustion engine until the end of the first cycle at startup, the exhaust valve timing is maintained at the timing set in step 100.

When the first cycle at startup has ended, i.e., in the second cycle at startup and thereafter, the exhaust valve timing is changed from opening late (i.e., retarded opening) to early closing (step 104). The valve timing shown in FIG. 3B is the valve timing that is set in step 104. As is evident upon comparing FIGS. 3B and 3C, in step 104, the EVC is set to the advance side from what it is during normal operation. More specifically, the EVC is set beyond TDC to the advance side. From the second cycle at startup until the condition in the next step, step 6, has been satisfied, the exhaust valve timing is maintained at the valve timing set in step 104. The intake valve timing is not changed, i.e., it is set the same as it is during normal operation, which is the same as it is in the first cycle at startup.

In step 106, it is determined whether a coolant temperature Teng measured by the signal from the coolant temperature sensor 54 is equal to, or greater than, a predetermined reference temperature To. Whether or not unburned HC adheres to the surface of the cylinder wall depends on the surface temperature of that cylinder wall. The coolant temperature Teng represents that cylinder wall surface temperature. The reference temperature To is a coolant temperature that corresponds to the wall surface temperature at which unburned HC no longer (or only a negligible amount) adheres to the cylinder wall surface. If the coolant temperature Teng is equal to or greater than the reference temperature To in step 106, the exhaust valve timing is changed from closing early to the normal valve timing, i.e., to the valve timing shown in FIG. 3C (step 108).

Figure 4A:
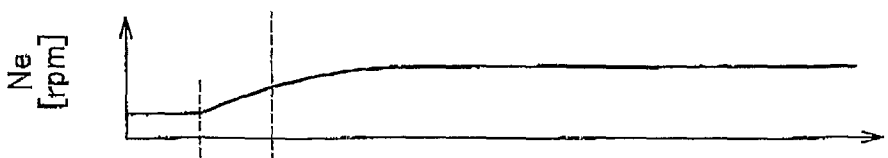
FIGS. 4A, 4B, 4C, and 4D are time charts illustrating the effects of the routine shown in FIG. 2.
Figure 4B:
Figure 4C:
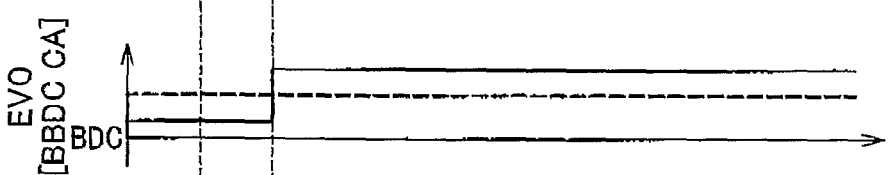
Figure 4D:
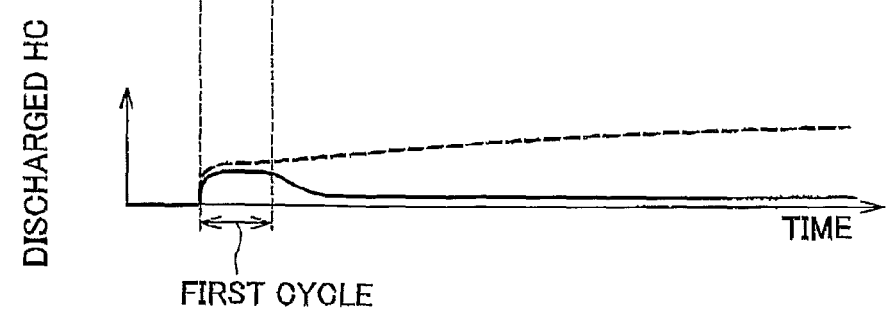

FIGS. 4A to 4D are time charts showing the results of executing the exhaust valve timing control routine described above. FIG. 4A shows the engine speed Ne, FIG. 4B shows the advance angle (BTDC) with respect to TDC of the EVC, FIG. 4C shows the advance angle (BBDC) with respect to BDC of the EVO, and FIG. 4D shows the amount of unburned HC discharged from the combustion chamber 10. In FIGS. 4B and 4C, the solid lines indicate the exhaust valve timing settings by the routine described above, and the broken lines indicate the conventional exhaust valve timing settings (which are the same as the settings during normal operation). Also, in FIG. 4D, the solid line indicates the amount of discharged unburned HC that is achieved by executing the routine, and the broken line indicates the amount of discharged unburned HC that is achieved by the conventional exhaust valve timing settings.

As shown in FIGS. 4A to 4D, the amount of unburned HC discharged from the combustion chamber 10 when the exhaust valve 14 opens is reduced by setting the EVO in the first cycle at startup to the retard side with respect to the setting during normal operation (i.e., BBDC 45 degrees) so that it is closer to BDC. The reason for this is as follows.

Figure 5:
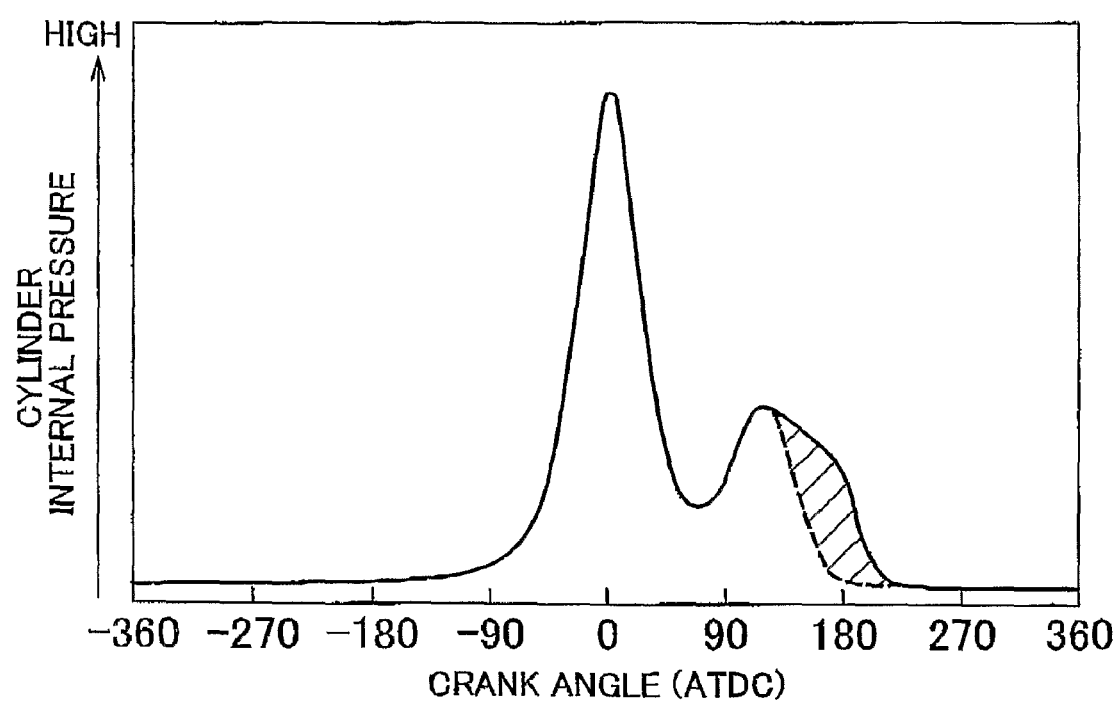
FIG. 5 is a view showing the relationship between EVO and the change in pressure inside the cylinder.

FIG. 5 is a view showing the change in the combustion gas pressure within the combustion chamber 10 (i.e., the cylinder internal pressure). The solid line in FIG. 5 indicates the change in cylinder internal pressure when the EVO is set to the retard side of BBDC 45 degrees. The broken line in FIG. 5 indicates the change in the internal cylinder pressure when the EVO is set to BBDC 45 degrees (i.e., shows the change in cylinder internal pressure during normal operation). The cylinder internal pressure drops suddenly as the exhaust valve 14 opens. However, as shown in the drawing, retarding the EVO makes it possible to gain cylinder internal pressure by an amount equivalent to the region shown by hatching in the drawing. That is, it is possible to close the fuel for the initial combustion in the high pressure combustion chamber 10 for a longer period of time, which makes it possible to promote an oxidation reaction of the fuel in a high temperature-high pressure atmosphere. Accordingly, the amount of unburned HC that adheres to the cylinder wall surface can be reduced, which enables the amount of unburned HC discharged from the combustion chamber 10 to be reduced.

Also, in the second cycle at startup and thereafter in which there is residual combustion gas in the combustion chamber 10, even if unburned HC that has adhered to the cylinder wall surface is pushed up by the piston 8 as it rises, it is possible to prevent that unburned HC from being discharged together with the combustion gas from the combustion chamber 10 by setting the EVC to the advance side of TDC. That is, it possible to close the unburned HC adhered to the cylinder wall surface in the combustion chamber 10 together with the residual gas, which in turns enables the amount of unburned HC discharged from the combustion chamber 10 to be reduced. Furthermore, the unburned HC that is closed in the combustion chamber 10 is reduced to particle size by the residual gas so there is also an oxidation reaction promotion effect.

Although omitted in the time charts of FIGS. 4A to 4D, according to the foregoing routine, when the engine temperature reaches a certain temperature, the exhaust valve timing is changed to the normal valve timing, i.e., a valve timing in which the opening timing of the exhaust valve is BBDC 45 degrees. Most of the unburned HC during startup is due to fuel adhering to the cylinder wall surface in droplet form. The amount of fuel that adheres to the cylinder wall surface, however, decreases as the engine temperature increases. Accordingly, it is possible to reduce the amount of unburned HC that is discharged at startup by setting the exhaust valve timing as shown in FIG. 4 until the engine temperature rises sufficiently. Once the engine temperature has risen sufficiently, the desired operating performance can then be obtained without the amount of unburned HC that is discharged increasing by changing the valve timing to the normal valve timing.

Next, a second exemplary embodiment of the invention will be described with reference to FIGS. 6 to 8A-8D. The schematic structure of the internal combustion engine to which the control apparatus according to the second exemplary embodiment of the invention is applied is as shown in FIG. 1, just like the first exemplary embodiment. The internal combustion engine according to this exemplary embodiment, however, differs from that of the first exemplary embodiment in that the structure of the exhaust valve timing control apparatus 24 is different. In this exemplary embodiment, a variable valve mechanism in which the operation angle as well as the valve timing can be changed is used as the exhaust valve timing control apparatus 24. This variable valve mechanism may be a variable valve mechanism that is able to variably control the valve closing timing and the valve opening timing independently of one another like an electromagnetically driven valve, or may be a mechanical type variable valve mechanism that changes the valve closing timing and the valve opening timing in association with the operation angle.

Figure 6:
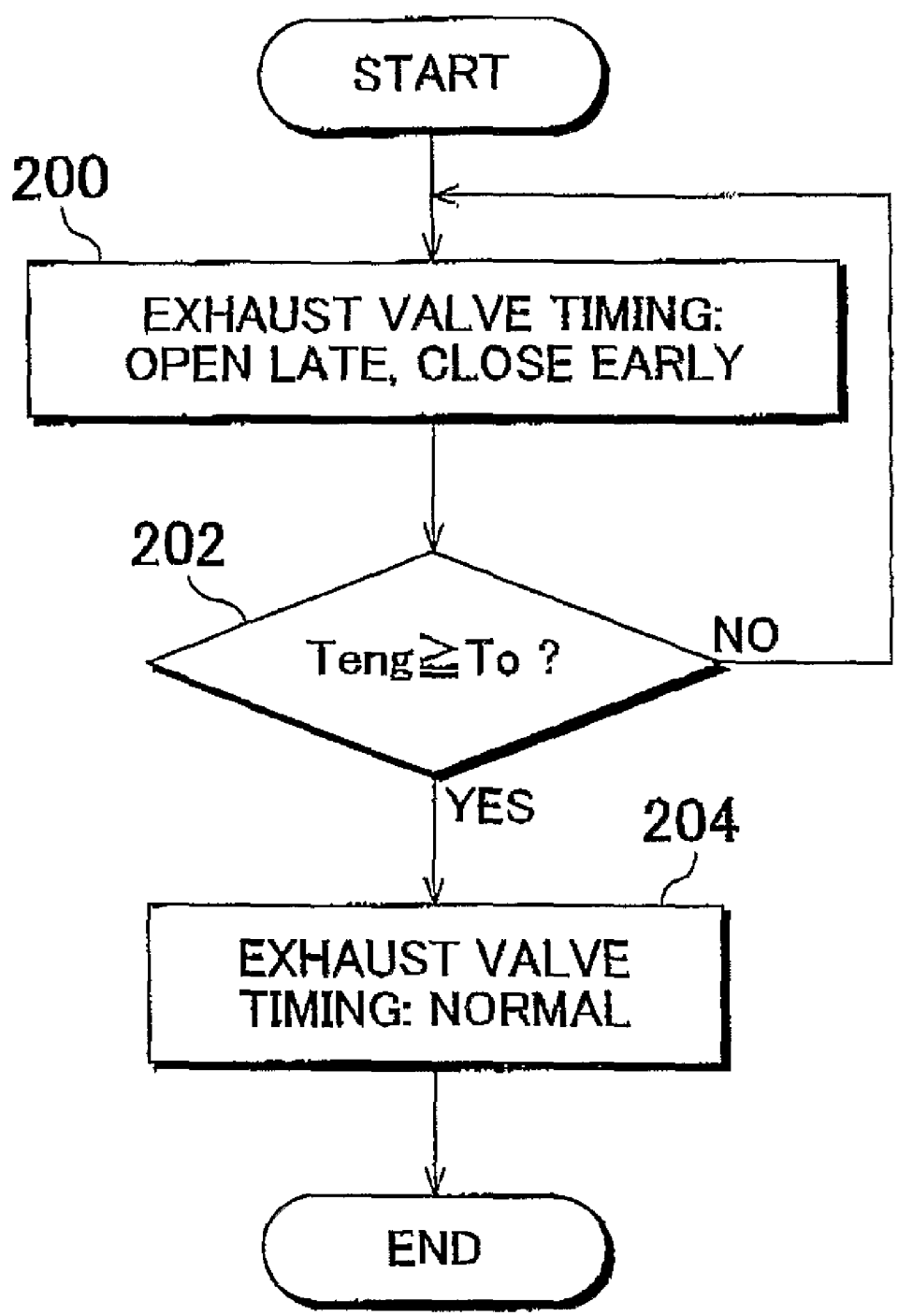
FIG. 6 is a flowchart of an exhaust valve timing control routine that is executed in a second exemplary embodiment of the invention.

FIG. 6 is a flowchart illustrating the details of the exhaust valve timing control executed by the ECU 50 in this exemplary embodiment. The routine shown in FIG. 6 is executed simultaneously with the turning on of the ignition switch 58 and the start of cranking of the internal combustion engine. Also, this routine is executed for each cylinder.

Figure 7A:
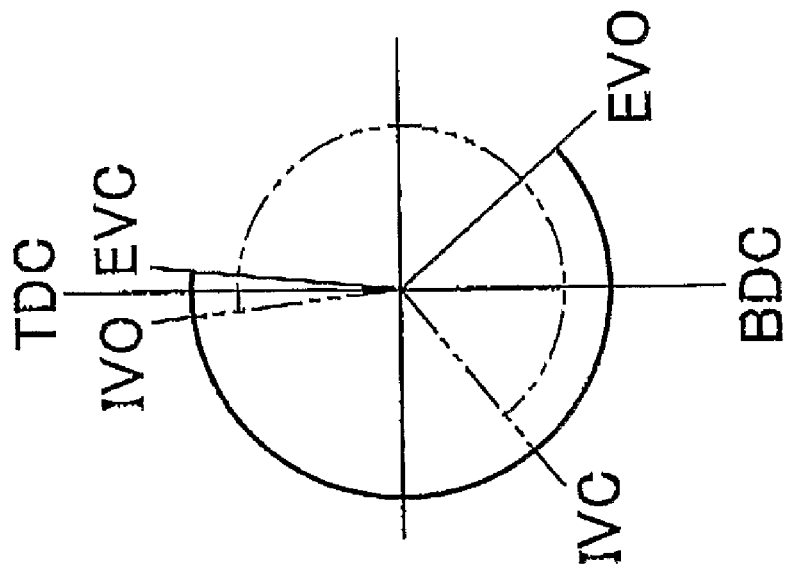
FIG. 7A is a view showing the valve timings of the intake and exhaust valves at startup, according to the second exemplary embodiment of the invention.
Figure 7B:
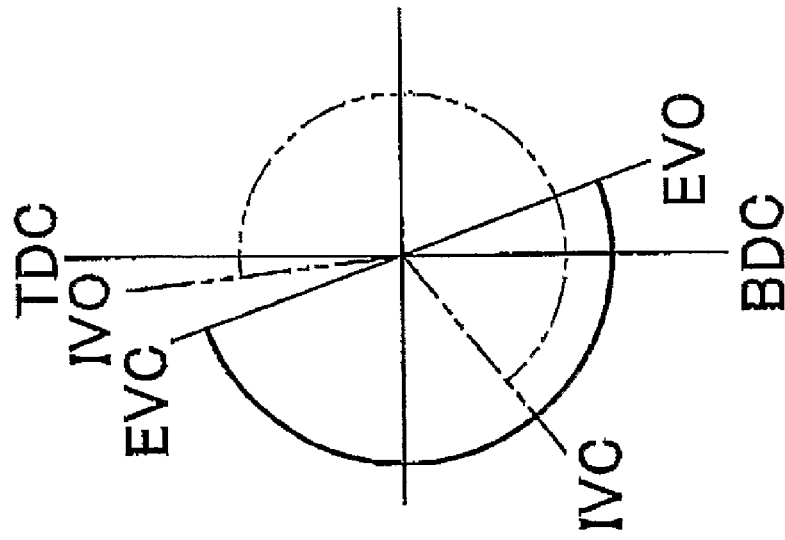
FIG. 7B is a view showing the valve timings of the intake and exhaust valves during normal operation, according to the second exemplary embodiment of the invention.

First in step 200 of this routine, the exhaust valve timing control apparatus 24 sets the exhaust valve timing so that the exhaust valve 14 opens late (i.e., opening is retarded) and closes early (i.e., closing is advanced). That is, the exhaust valve timing control apparatus 24 sets the opening timing (EVO) of the exhaust valve 14 to the retard side of the normal opening timing, i.e., BBDC 45 degrees), and sets the closing timing (EVC) to the advance side of TDC. FIGS. 7A and 7B are views showing the valve timings of the intake valve 12 and the exhaust valve 14. The valve timing shown in FIG. 7B is the normal valve timing, while the valve timing shown in FIG. 7A is the valve timing set in step 200. As is evident upon comparing FIGS. 7A and 7B, in step 200, the EVO is set closer to BDC than it is during normal operation, and the intake valve timing is set the same as it is during normal operation.

The exhaust valve timing control apparatus 24 maintains the exhaust valve timing at the valve timing set in step 200 from the start of cranking of the internal combustion engine until the condition in the next step, step 202, is satisfied. That is, in this exemplary embodiment, in the first cycle at startup as well as in second cycle and thereafter at startup, the exhaust valve timing is set so that the valve opens late (i.e., opening is retarded) and closes early (i.e., closing is advanced) until the condition in step 202 is satisfied.

In step 202, it is determined whether the coolant temperature Teng measured by the signal from the coolant temperature sensor 54 is equal to or greater than a predetermined reference temperature To. The reference temperature To is a coolant temperature that corresponds to the cylinder wall surface temperature at which unburned HC no longer (or only a negligible amount) adheres to the cylinder wall surface. If the coolant temperature Teng is equal to or greater than the reference temperature To in step 202, the exhaust valve timing is changed from opening late and closing early to the normal valve timing, i.e., to the valve timing shown in FIG. 7B (step 204). In this exemplary embodiment, the cycle during which the coolant temperature Teng becomes equal to or greater than the reference temperature To corresponds to a predetermined cycle (i.e., an Nth cycle).

Figure 8A:
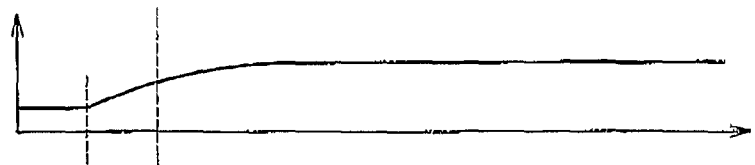
FIGS. 8A, 8B, 8C, and 8D are time charts illustrating the effects of the routine shown in FIG. 6.
Figure 8B:
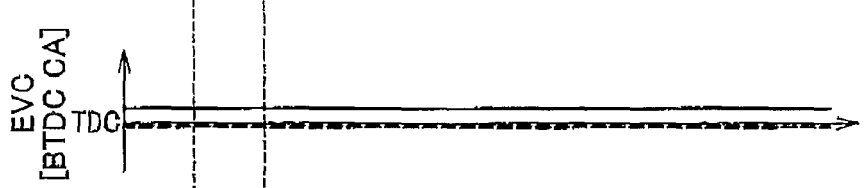
Figure 8C:
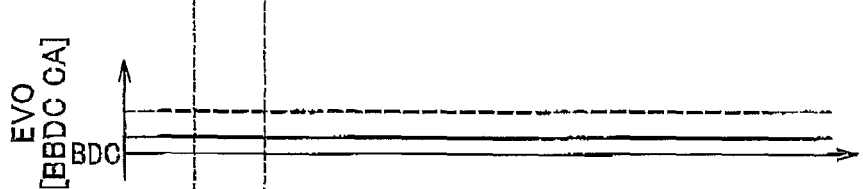
Figure 8D:
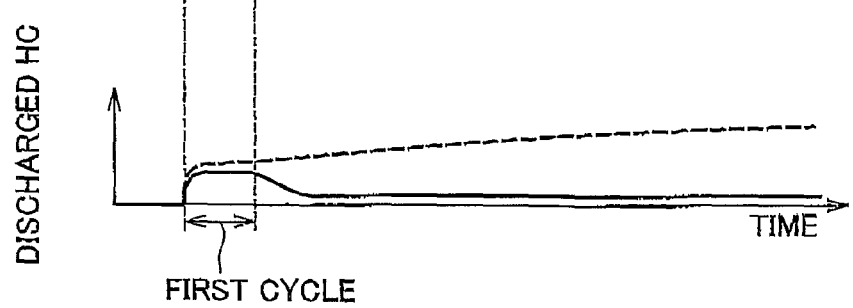

FIGS. 8A to 8D are time charts showing the results of executing the exhaust valve timing control routine described above. FIG. 8A shows the engine speed Ne, FIG. 8B shows the advance angle (BTDC) with respect to TDC of the EVC, FIG. 8C shows the advance angle (BBDC) with respect to BDC of the EVO, and FIG. 8D shows the amount of unburned HC discharged from the combustion chamber 10. In FIGS. 8B and 8C, the solid lines indicate the exhaust valve timing settings by the routine described above, and the broken lines indicate the conventional exhaust valve timing settings (which are the same as the settings during normal operation). Also, in FIG. 8D, the solid line indicates the amount of discharged unburned HC that is achieved by executing the routine, and the broken line indicates the amount of discharged unburned HC that is achieved by the conventional exhaust valve timing settings.

As shown in FIGS. 8A to 8D, setting the EVO in the first cycle at startup to the retard side of the setting during normal operation (i.e., BBDC 45 degrees) so that it is closer to BDC makes it possible to close the fuel in the high pressure combustion chamber 10 for a longer period of time, which makes it possible to promote an oxidation reaction of the fuel in a high temperature-high pressure atmosphere. As a result, the amount of unburned HC that adheres to the cylinder wall surface can be reduced, which in turn enables the amount of unburned HC discharged from the combustion chamber 10 when the exhaust valve 14 opens to be reduced. This effect can be obtained not only in the first cycle at startup, but also in the second cycle at startup and thereafter.

Also, setting the EVC to the advance side of TDC from the first cycle at startup makes it possible to realize the following effect. That is, even if unburned HC adhered to the cylinder wall surface is pushed up by the piston 8 when it rises during the second cycle at startup and thereafter when there is residual combustion gas in the combustion chamber 10, that unburned HC can be prevented from being discharged from the combustion chamber 10 together with the combustion gas. Even if the EVC is set to the advance side of TDC from the second cycle at startup, that unburned HC can still be prevented from being discharged from the combustion chamber 10 together with the combustion gas. That is, the unburned HC adhered to the cylinder wall surface can be closed in the combustion cylinder 10 along with the residual gas, thus enabling the amount of unburned HC discharged from the combustion chamber 10 to be reduced. Furthermore, the unburned HC that is closed in the combustion chamber 10 is reduced to particle size by the residual gas so there is also an oxidation reaction promotion effect.

Although omitted in the time charts of FIGS. 8A to 8D, according to the foregoing routine, when the engine temperature reaches a certain temperature, the exhaust valve timing is changed to the normal valve timing. Most of the unburned HC during startup is due to fuel adhering to the cylinder wall surface in droplet form. The amount of fuel that adheres to the cylinder wall surface, however, decreases as the engine temperature increases. Accordingly, it is possible to reduce the amount of unburned HC that is discharged at startup by setting the exhaust valve timing as shown in FIGS. 8B and 8C until the engine temperature rises sufficiently. Once the engine temperature has risen sufficiently, the desired operating performance can then be obtained without the amount of unburned HC that is discharged increasing by changing the valve timing to the normal valve timing.

Figure 9:
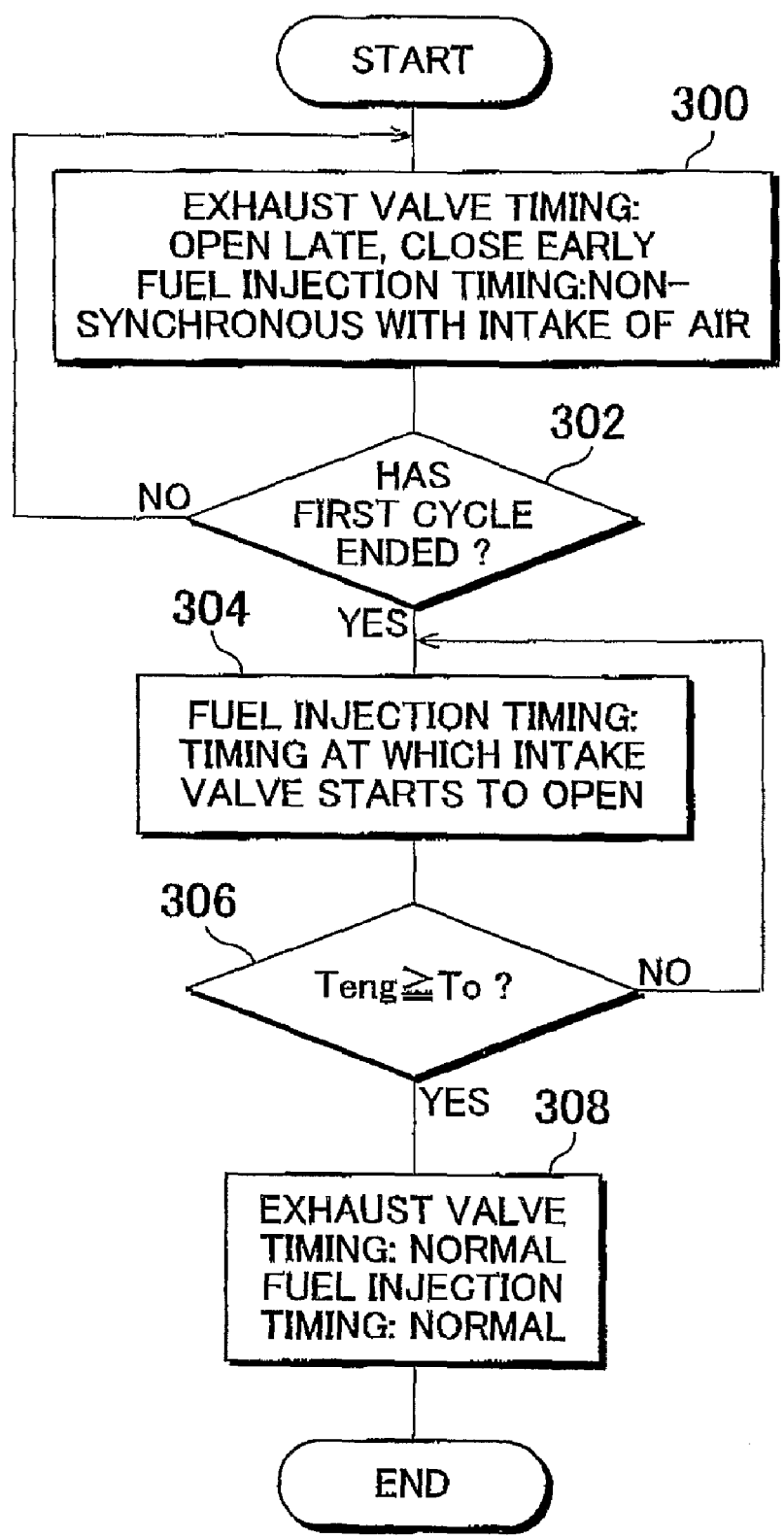
FIG. 9 is a flowchart of an exhaust valve timing control and fuel injection timing control routine that is executed in a third exemplary embodiment of the invention.
Figure 10:
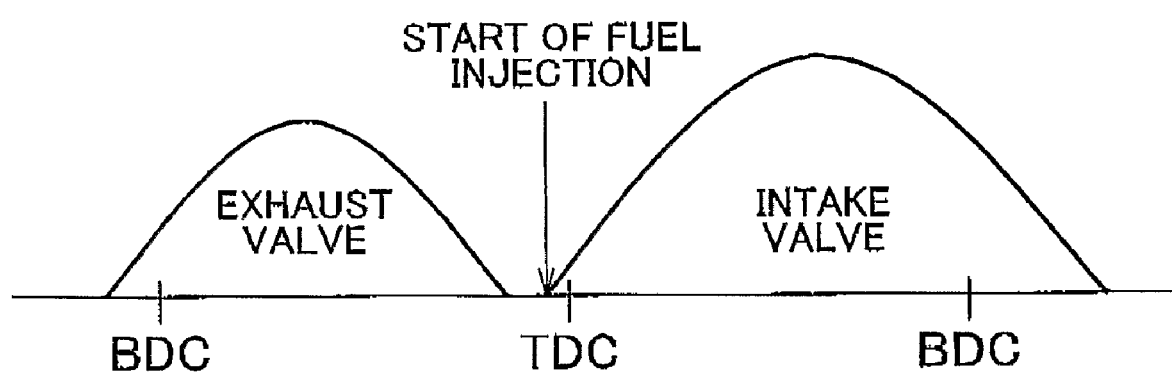
FIG. 10 is a view illustrating both intake and exhaust valve timings and the fuel injection start timing according to the third exemplary embodiment of the invention.

Next, a third exemplary embodiment of the invention will be described with reference to FIGS. 9 to 10. The control apparatus 3 according to the third exemplary embodiment of the invention can be realized by the ECU 50 in the structure of the internal combustion engine according to the second exemplary embodiment executing the routine shown in FIG. 9 instead of the routine shown in FIG. 6. With the routine shown in FIG. 9, control of the fuel injection timing is also performed in addition to control of the exhaust valve timing like that which is performed in the routine shown in FIG. 6. The routine shown in FIG. 9 is executed simultaneously with the turning on of the ignition switch 58 and the start of cranking of the internal combustion engine. Also, this routine is executed for each cylinder.

First in step 300 of this routine, the exhaust valve timing control apparatus 24 sets the exhaust valve timing so that the exhaust valve 14 opens late (i.e., opening is retarded) and closes early (i.e., closing is advanced). That is, the exhaust valve timing control apparatus 24 sets the opening timing (EVO) of the exhaust valve 14 to the retard side of the normal opening timing, i.e., BBDC 45 degrees), and sets the closing timing (EVC) to the advance side of TDC. The valve timings of the intake valve 12 and the exhaust valve 14 at this time are the same as those in the second exemplary embodiment and are shown in FIG. 7A. Also, the fuel injection timing is set in step 300 so that fuel is injected before the intake valve 12 opens. That is, a fuel injection is performed which is non-synchronous with the intake of air.

Next in step 302, it is determined whether the first cycle at startup in the corresponding cylinder has ended. This determination can be made based on the rotation angle of the crankshaft 18 which is measured by the signal from the crank angle sensor 52. From the time cranking of the internal combustion engine starts until the end of the first cycle at startup, the exhaust valve timing is maintained at the timing set in step 300. For the fuel injection timing of the first cycle at startup, the fuel injection which is non-synchronous with the intake of air set in step 300 is performed.

When the first cycle at startup has ended, i.e., in the second cycle at startup and thereafter, the fuel injection timing is set to the timing at which the intake valve 12 starts to open (step 304). The valve timings of the intake valve 12 and the exhaust valve 14 are kept at the valve timings set in step 300 for the second cycle at startup and thereafter as well. FIG. 10 is a view illustrating both the valve timings of the intake valve 12 and the exhaust valve 14 together with the fuel injection start timing. As shown in FIG. 10, the opening timing of the intake valve 12 (IVO) is set to near TDC, and the injection of fuel from the injector 34 starts substantially simultaneously with the IVO.

In the next step, step 306, it is determined whether a coolant temperature Teng measured by the signal from the coolant temperature sensor 54 is equal to, or greater than, a predetermined reference temperature To. The reference temperature To is a coolant temperature that corresponds to the cylinder wall surface temperature at which unburned HC no longer (or only a negligible amount) adheres to the cylinder wall surface. If the coolant temperature Teng is equal to or greater than the reference temperature To in step 306, the exhaust valve timing is changed from opening late and closing early to the normal valve timing, and the fuel injection timing is also changed from the timing at which the intake valve 12 starts to open to the normal fuel injection timing (step 308).

According to the routine described above, in the first cycle at startup in which there is no residual combustion gas in the combustion chamber 10, sufficient vaporization time of the fuel in the intake port can be ensured by injecting the fuel before the intake valve 12 opens, by the fuel injection which is non-synchronous with the intake of air. Also, setting the EVO to the retard side with respect to the setting during normal operation (i.e., BBDC 45 degrees) so that it is closer to BDC from the first cycle at startup makes it possible to close the fuel in the high pressure combustion chamber 10 for a longer period of time, which in turn makes it possible to promote an oxidation reaction of the fuel in a high temperature-high pressure atmosphere. As a result, the amount of unburned HC that adheres to the cylinder wall surface is able to be reduced.

In and after the second cycle at startup in which there is residual combustion gas in the combustion chamber 10, atomization of the fuel can be promoted by the high temperature combustion gas blown back to the intake port from inside the combustion chamber 10 by injecting the fuel at the timing when the intake valve 12 starts to open. Also, it is possible to increase the burn time of the fuel inside the combustion chamber 10 by setting the EVO to the retard side with respect to the setting during normal operation so that it is closer to BDC, just like in the first cycle at startup. As a result, combustion of the fuel in the combustion chamber 10 can be promoted and the amount of unburned HC that adheres to the cylinder wall surface can be reduced.

Furthermore, setting the EVC to the advance side of TDC from the first cycle at startup makes it possible to realize the following effect. That is, even if unburned HC adhered to the cylinder wall surface is pushed up by the piston 8 when it rises in the second cycle at startup and thereafter in which there is residual combustion gas in the combustion chamber 10, that unburned HC can be prevented from being discharged from the combustion chamber 10 together with the combustion gas. Even if the EVC is set to the advance side of TDC from the second cycle at startup, that unburned HC can still be prevented from being discharged from the combustion chamber 10 together with the combustion gas. That is, the unburned HC adhered to the cylinder wall surface can be closed in the combustion cylinder 10 along with the residual gas, thus enabling the amount of unburned HC discharged from the combustion chamber 10 to be reduced.

Although the invention has been described herein with reference to specific embodiments, it is not limited to those embodiments, but rather may be embodied in other specific forms without departing from the spirit or essential characteristics thereof. For example, the foregoing exemplary embodiments may also be implemented with the following modifications.

The fuel injection timing control according to the third exemplary embodiment can also be combined with the exhaust valve timing control according to the first exemplary embodiment. That is, in the first cycle at startup, the exhaust valve timing may be set to open late and the fuel injection timing may be set to a timing that is non-synchronous with the intake of air. Then in the second cycle at startup and thereafter, the exhaust valve timing may be set to close early and the fuel injection timing may be set to the timing at which the intake valve 12 starts to open.

Also, in the foregoing exemplary embodiments, the engine temperature is estimated from the coolant temperature, but it may also be estimated from the exhaust gas temperature. Further, the engine temperature may also be estimated by the operating time from the beginning of startup.

What is claimed is:

1. A control apparatus for an internal combustion engine, comprising:
   a controller that changes an opening timing and a closing timing of an exhaust valve with an operation angle of the exhaust valve being fixed and remaining constant;
   controls the opening timing of the exhaust valve to a retard side of the opening timing set in a second cycle and thereafter until a first cycle at startup ends;
   controls an injection timing of fuel into an intake port from a fuel injection valve; and
   sets the fuel injection timing in the first cycle at startup to within a period during which an intake valve is closed, and sets the fuel injection timing in the second cycle at startup and thereafter to match the opening timing of the intake valve.

2. The control apparatus for an internal combustion engine according to claim 1, wherein:
   the controller controls the closing timing of the exhaust valve to an advance side of top-dead-center of the intake stroke in the second cycle at startup and thereafter.

3. The control apparatus for an internal combustion engine according to claim 1, wherein
   the controller changes the valve timing of the exhaust valve to a normal valve timing determined from the operating state of the internal combustion engine when an engine temperature exceeds a predetermined temperature or when it is estimated that the engine temperature has exceeded the predetermined temperature.

4. A control apparatus for an internal combustion engine, comprising:
   a controller that changes an opening timing and a closing timing of an exhaust valve either independently or in association with an operation angle of the exhaust valve and with operation angle being variable;
   controls the opening timing of the exhaust valve to a retard side of the opening timing set in a cycle that is next after a predetermined cycle and thereafter from startup until the predetermined cycle ends;

controls an injection timing of fuel into an intake port from a fuel injection valve; and sets the fuel injection timing in the first cycle at startup to within a period during which an intake valve is closed, and sets the fuel injection timing in the second cycle at startup and thereafter to match the opening timing of the intake valve.

5. The control apparatus for an internal combustion engine according to claim 4, wherein the controller controls the closing timing of the exhaust valve to an advance side of top-dead-center of an intake stroke in a second cycle at startup and thereafter at the latest.

6. The control apparatus for an internal combustion engine according to claim 5 wherein the controller controls the closing timing of the exhaust valve to an advance side of top-dead-center of the intake stroke in a first cycle at startup and thereafter.

7. The control apparatus for an internal combustion engine according to claim 4, wherein the controller designates the predetermined cycle to be when an engine temperature has exceeded a predetermined temperature or when it is estimated that the engine temperature has exceeded the predetermined temperature, and changes the valve timing of the exhaust valve to a normal valve timing determined from the operating state of the internal combustion engine in the next cycle after the predetermined cycle and thereafter.

8. A control method for an internal combustion engine in which an operation angle is fixed, comprising:

changing an opening timing and a closing timing of an exhaust valve with the operation angle remaining constant;

controlling the opening timing of the exhaust valve to a retard side of the opening timing set in a second cycle and thereafter until a first cycle at startup ends; and when the internal combustion engine controls an injection timing of fuel into an intake port from a fuel injection valve, setting the fuel injection timing in the first cycle at startup to within a period during which the intake valve is closed, and setting the fuel injection timing in the second cycle at startup and thereafter to match the opening timing of the intake valve.

9. The control method for an internal combustion engine according to claim 8 further comprising:

controlling the closing timing of the exhaust valve to an advance side of top-dead-center of an intake stroke in the second cycle at startup and thereafter.

10. The control method for an internal combustion engine according to claim 8 further comprising:

changing the valve timing of the exhaust valve to a normal valve timing determined from the operating state of the internal combustion engine when an engine temperature exceeds a predetermined temperature or when it is estimated that the engine temperature has exceeded the predetermined temperature.

11. A control method for an internal combustion engine in which an operation angle is variable, comprising:

changing an opening timing and a closing timing of an exhaust valve either independently or in association with the operation angle;

controlling the opening timing of the exhaust valve to a retard side of the opening timing set in a cycle that is next after a predetermined cycle and thereafter from startup until the predetermined cycle ends; and when the internal combustion engine controls an injection timing of fuel into an intake port from a fuel injection valve, setting the fuel injection timing in a first cycle at startup to within a period during which an intake valve is closed, and setting the fuel injection timing in a second cycle at startup and thereafter to match the opening timing of the intake valve.

12. The control method for an internal combustion engine according to claim 11, further comprising controlling the closing timing of the exhaust valve to an advance side of top-dead-center of an intake stroke in a second cycle at startup and thereafter at the latest.

13. The control method for an internal combustion engine according to claim 12, further comprising controlling the closing timing of the exhaust valve to an advance side of top-dead-center of the intake stroke in a first cycle at startup and thereafter.

14. The control method for an internal combustion engine according to claim 11, further comprising designating the predetermined cycle to be when an engine temperature has exceeded a predetermined temperature or when it is estimated that the engine temperature has exceeded the predetermined temperature, and changing the valve timing of the exhaust valve to a normal valve timing determined from the operating state of the internal combustion engine in the next cycle after the predetermined cycle and thereafter.

* * * * *